(12) United States Patent
Smith et al.

(10) Patent No.: US 8,744,399 B2
(45) Date of Patent: Jun. 3, 2014

(54) ALARM SYSTEM CALL-BACK NUMBER PROVISION AND RETRIEVAL

(75) Inventors: Derek C. Smith, Maple (CA); Robert N. Evans, Alliston (CA); Jitendra Patel, Mississauga (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 0 days.

(21) Appl. No.: 13/454,254

(22) Filed: Apr. 24, 2012

(65) Prior Publication Data

US 2013/0281044 A1  Oct. 24, 2013

(51) Int. Cl.
*H04M 11/04* (2006.01)

(52) U.S. Cl.
USPC ..................................................... 455/404.1

(58) Field of Classification Search
USPC ........ 455/404.1–404.2, 414.1, 418–420, 466, 455/414.2
See application file for complete search history.

(56) References Cited

U.S. PATENT DOCUMENTS

| | | | |
|---|---|---|---|
| 5,327,478 A * | 7/1994 | Lebowitz | 379/40 |
| 6,693,545 B2 * | 2/2004 | Brown et al. | 340/573.1 |
| 7,212,111 B2 * | 5/2007 | Tupler et | 340/539.18 |
| 7,330,109 B2 * | 2/2008 | Martin | 340/506 |
| 8,331,899 B2 * | 12/2012 | Broms | 455/404.1 |
| 2006/0064505 A1 * | 3/2006 | Lee et al. | 709/238 |
| 2011/0032109 A1 * | 2/2011 | Fox | 340/628 |
| 2012/0157034 A1 * | 6/2012 | Martin et al. | 455/404.1 |
| 2012/0250834 A1 * | 10/2012 | Smith et al. | 379/45 |

* cited by examiner

*Primary Examiner* — Brandon Miller
(74) *Attorney, Agent, or Firm* — Smart & Biggar (57) ABSTRACT

A control panel of an alarm system at a premises stores call-back numbers/addresses and provides these to a monitoring center, as required. In embodiments, the call-back numbers/address may be provided along with the signalling of an alarm condition. In other embodiments, call-back numbers/addresses may be retrieved from the panel at the request of an operator or installer, or periodically. Call-back numbers/address may be stored or updated at the panel by installers or occupants, or automatically.

11 Claims, 6 Drawing Sheets

| Panel ID | Call-Back Address_1 | Condition | Priority | Call-Back Address_2 | Condition | Priority | ... | Call-Back Address_N | Condition | Priority |
|---|---|---|---|---|---|---|---|---|---|---|
| | | | | | | | | | | |

ALARM SYSTEM CALL-BACK NUMBER PROVISION AND RETRIEVAL

FIELD OF THE INVENTION

The present invention relates generally to security systems, and more particularly to systems that provide call-back addresses/numbers in order to notify or contact individuals of an alarm condition.

BACKGROUND

Business and home premises are commonly equipped with a security system for detecting alarm conditions and reporting these to a monitoring center. One of the primary functions of the monitoring center is to notify a human operator when one or more alarm conditions have been sensed by detectors installed at a monitored premises.

Detectors may vary from relatively simple hard-wired detectors, such as door or window contacts to more sophisticated battery operated ones, such as motion and glass break detectors. The detectors may each report to an alarm control panel at the premises. The control panel is typically installed in a safe location and is connected to a power supply. The control panel is further in communication with the individual detectors to communicate with or receive signals from individual detectors. The communication between the alarm control panel and the detectors can be one or two way, and may be wired or wireless.

The control panel, in turn, communicates from the premises to the monitoring center typically using any of a number of communications networks, including the public switched telephone network (PSTN); a cellular telephone or data network; a packet switched network (e.g. the Internet), or the like.

In response to receiving a message signalling an alarm condition, the monitoring center usually initiates a communication to one or more designated individuals, and/or to appropriate security personnel. The security personnel may be the police or employees of a private security company. The designated individuals may be residents at the premises or their designees.

Typically (but not always), the communication from the monitoring center to the designated individuals, is by way of telephone call to one or more designated telephone numbers—referred to as call-back numbers. Calls from the monitoring center to designated individuals may notify those individuals of the alarm condition, and confirm that a false alarm has not been signalled.

Calls to security personnel may dispatch appropriate individuals, such as representatives from the police, fire department or the like, to the premises for follow up.

Recently, equipping the premises with microphones and speakers to allow the premises communicate with the monitoring center has also become commonplace. Microphones provide audio signals, representing audio sensed at the microphone to the monitoring center, thereby allowing the monitoring center to monitor audio at the premises in case of an alarm condition. The speakers, in turn, allow an operator at the monitoring center to speak with the premises in real-time. Conveniently, an operator at the monitoring center may listen and react to events at a monitored premise, as they occur. For example, the operator at the monitoring center may speak to an occupant or intruder upon being notified of an alarm condition.

Again, such two way audio communication to the premises may be established by way of a telephone call to a designated call-back number to equipment at the premises.

As the foregoing illustrates, each alarm system may thus be associated with numerous call-back number that should be contacted, often in a particular order, upon occurrence of an alarm condition. Conventionally, the list of call-back numbers is established upon installation of the alarm system and stored at the monitoring center for easy access. Changes to the call-back number(s) may be provided by occupants at the premises, as required, for example by placing a call to an administrator of the monitoring center. However, ensuring that the call-back numbers are current, and allowing for their easy update remains a challenge.

Accordingly, there remains a need for methods and devices that allow for better call-back number provision and retrieval.

SUMMARY OF THE INVENTION

Exemplary of embodiments of the present invention, call-back numbers/addresses may be stored at the control panel of the alarm system at the premises, and provided to the monitoring center as required. In embodiments, the call-back numbers/address may be provided along with the signalling of an alarm condition. In other embodiments, the call-back numbers/addresses may be retrieved from the panel at the request of an operator or installer, or periodically. Call-back numbers/address may be stored or updated at the panel by installers or occupants, or automatically.

In a first aspect, there is provided a method of operating an alarm panel that signals sensed alarm conditions at a premises to a monitoring center over a packet switched data network, the method comprising: storing at least one call-back address to be contacted in case of an alarm condition at the alarm panel; and providing the a stored call-back address from the alarm panel to the monitoring center over the packet switched network.

In a second aspect, there is provided an alarm system for signalling sensed alarm conditions at a premises to a monitoring center over a packet switched data network, the panel comprising: a processor; a network interface, for interconnecting the alarm system to the packet switched data network; processor readable memory storing: at least one call-back address to be contacted in case of an alarm condition at the alarm panel; and software to provide the stored call-back address from the alarm panel to the monitoring center over the packet switched network.

In a third aspect, there is provided an alarm system for signalling sensed alarm conditions at a premises to a monitoring center over a packet switched data network, the panel comprising: a network interface, for interconnecting the alarm system to the packet switched data network; means for storing at least one call-back address to be contacted in case of an alarm condition at the alarm panel; and means for providing the stored call-back address from the alarm panel to the monitoring center over the packet switched network.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
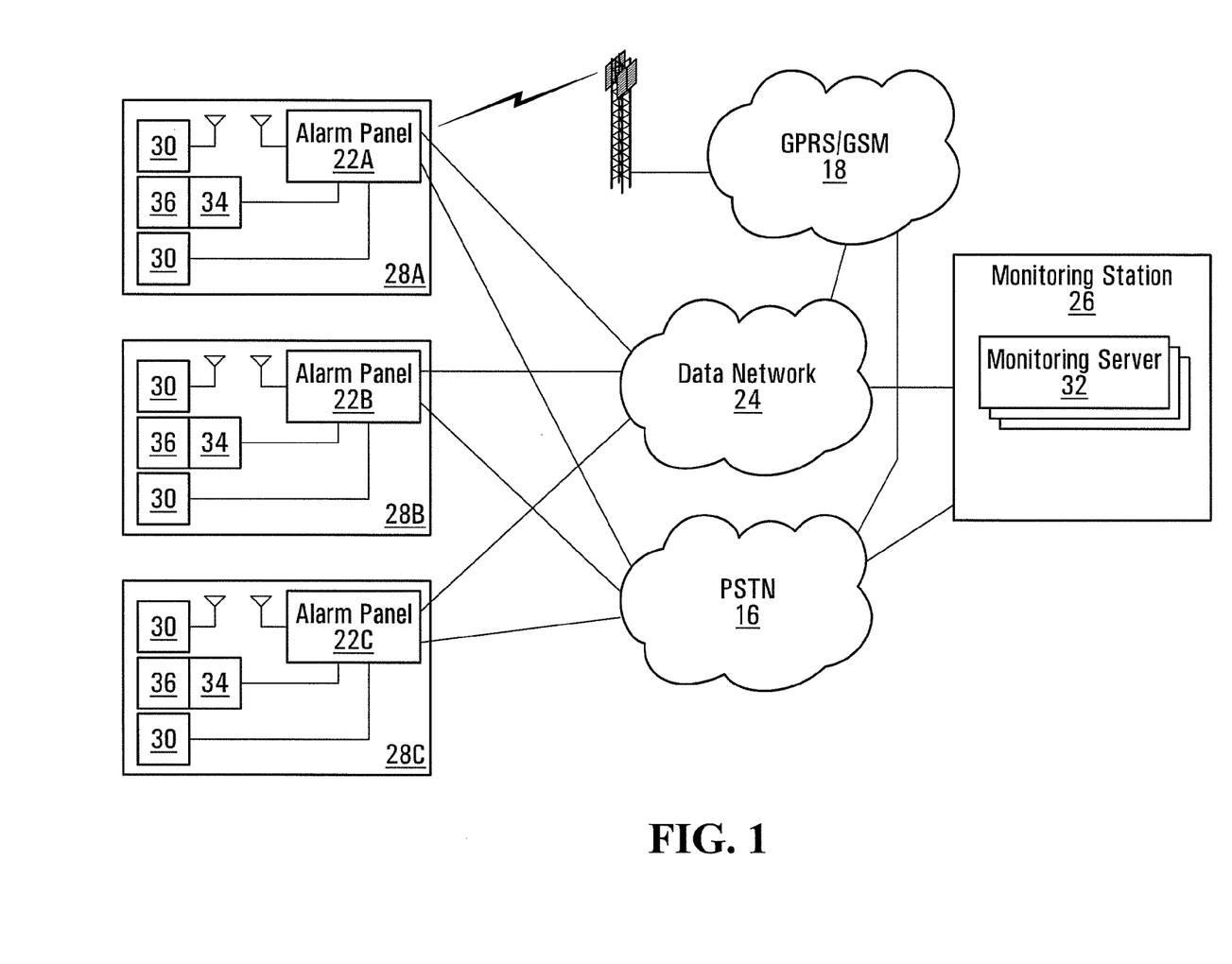
FIG. 1 is a schematic diagram of an alarm system, exemplary of an embodiment of the present invention.

FIG. 1 depicts an exemplary security system infrastructure 20 of security systems including multiple alarm panels 22a, 22b, 22c (individually and collectively panel 22) at customer premises 28a, 28b, 28c (individually and collectively premises 28), respectively, communicating through a data network 24 such as the Internet, with a central monitoring center 26. Only three premises 28 are illustrated for clarity. Additionally, panels 22 may communicate with monitoring center 26 through additional communication networks—like cellular network 18, and the PSTN 16.

As will be appreciated, data network 24 may be any combination of wired and wireless links capable of carrying packet switched traffic, and may span multiple carriers, and a wide geography. In one embodiment, data network 24 may simply be the public Internet. Further access points, such as routers, DSL modems, wireless radios, and the like possibly interconnecting panels 22 with data network 24 are not illustrated.

At residential or business premises 28, each alarm panel 22 may be interconnected with one or more detectors 30. Each of detectors 30 provides information regarding the status of the monitored premises to a local alarm panel 22. Detectors 30 may include, for example, motion detectors, glass break detectors, and contact switches. Detectors 30 may be hard wired to alarm panel 22 or may communicate with alarm panel 22 wirelessly, in manners known to persons of ordinary skill in the art. Alarm panel 22 may further include other interfaces such as key pads, sirens, and the like, not specifically shown in FIG. 1.

One particular detector 36, forming part of system infrastructure 20, is an audio input transducer that acts as a microphone, and allows audio at premises 28 to be sensed. Electrical signals corresponding to the sensed audio are provided to panel 22. The electrical signals may be analog or digital signals that may be compressed, either proximate audio detector 36 or at panel 22. In the event the signals are digital, they may be encoded at the audio detector 36.

Additionally, an alarm system at a premise 28 further includes another audio transducer that acts as a loud speaker (hereinafter speaker 34) to reproduce audio from panel 22. Although the term speaker is used to describer the transducer, it will be appreciated that speaker 34 may take the form of a piezo-electric or similar element, acting a speaker. Electrical signals corresponding to the audio are provided by panel 22. The electrical signals may again be analog or digital signals that may be compressed.

Links between panel 22 and audio detector 36 and speaker 34 may be wired or wireless.

Figure 2:
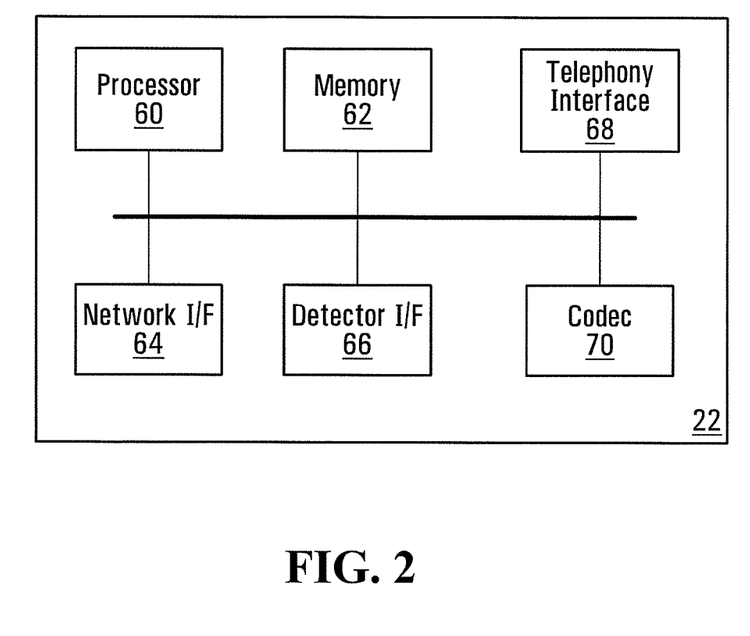
FIG. 2 is a schematic block diagram of a panel in the alarm system of FIG. 1, exemplary of an embodiment of the present invention.

As illustrated in FIG. 2, a typical alarm panel 22 includes a processor 60; memory 62 in communication with processor 60; a detector interface 66 for communication with detectors 30/36; and speaker 34; and a data network interface 64 for communication with data network 24. Panel 22 may further include a telephony interface 68 to allow incoming telephone (or cellular network) calls to be originated or received at panel 22, as further described below. Telephony interface 68 may be a PSTN interface, or alternatively an interface to communicate with cellular network 18. If telephony interface 68 interfaces with cellular network 18, telephony interface 68 may take the form of a GSM/UMTS, 3G, LTE, or similar cellular network interface capable of directing voice and/or data over cellular network 18. As well, telephony interface 68 may be capable of receiving incoming calls over network 18.

Memory 62 stores program instructions and data used by processor 60 of alarm panel 22. Memory 62 may be a suitable combination of random access memory and read-only memory, and may host a suitable firmware, operating software, and may be organized as a file system or otherwise.

Example alarm panels may comprise DSC® model SCW9155 suitably modified to operate as described herein.

As will become apparent, panel 22 under software control may be capable of separately establishing communication path to signals alarm conditions to monitoring center 26. Optionally, panel 22 may be able to exchange audio between monitoring center 26 and panel 22, in real-time. In the depicted embodiment data network 24 may be used to signal the alarm condition. The audio paths to and from the monitoring channel may be established over a cellular telephone network 18, or over the PSTN 16. A skilled person will readily recognize that the communications paths could be transported over the same network—such as the PSTN, a wireless network, the internet or the like.

Panel 22 may further optionally establish a data path to monitoring center 26 for the provision of configuration data, as further described below.

To this end, program instructions stored in memory 62 of panel 22 may additionally store software components allowing network communications and establishment of connections across data network 24. The software components may, for example, include an internet protocol (IP) stack, and a session initiation protocol (SIP) client, and a suitable voice over IP (VoIP) client. Of course, other software components suitable for establishing a connection and communicating across network 24 will be apparent to those of ordinary skill.

Program instructions stored in memory 62 of alarm panel 22, along with configuration data may control overall operation of panel 22. In particular, one or more data network addresses may be stored in memory of alarm panel 22. These network addresses may include the IP network addresses by which monitoring center 26 may be reached. Alarm panel 22 may send data associated with sensed alarm conditions sensed at premises 28 to central monitoring center 26.

As part of the configuration data, panel 22 may further store one or more call-back addresses that may be used by monitoring center 26 in response to receiving notification of an alarm condition, as detailed below. Configuration data, including stored call-back addresses may be programmed by an administrator or installer at panel 22, using a suitable interface, such as a keyboard and display, or by way of an external computing device.

Panel 22 may further include a voice codec 70 in communication with audio detector 36 and speaker 34 to encode voice detected at detector 36, and to decode voice data received from monitoring center 26. Voice codec 70 may, for example, be a voice coder encoder (and decoder), compliant with ITU Recommendation G.711, G.723, G.729, or any other known voice coding algorithm or standard. Voice codec 70 may be a hardware component separate from the processor of panel 22, and is illustrated as such in FIG. 2, or may be formed in software, stored for example in memory 62 for execution by the processor of panel 22.

Figure 3:
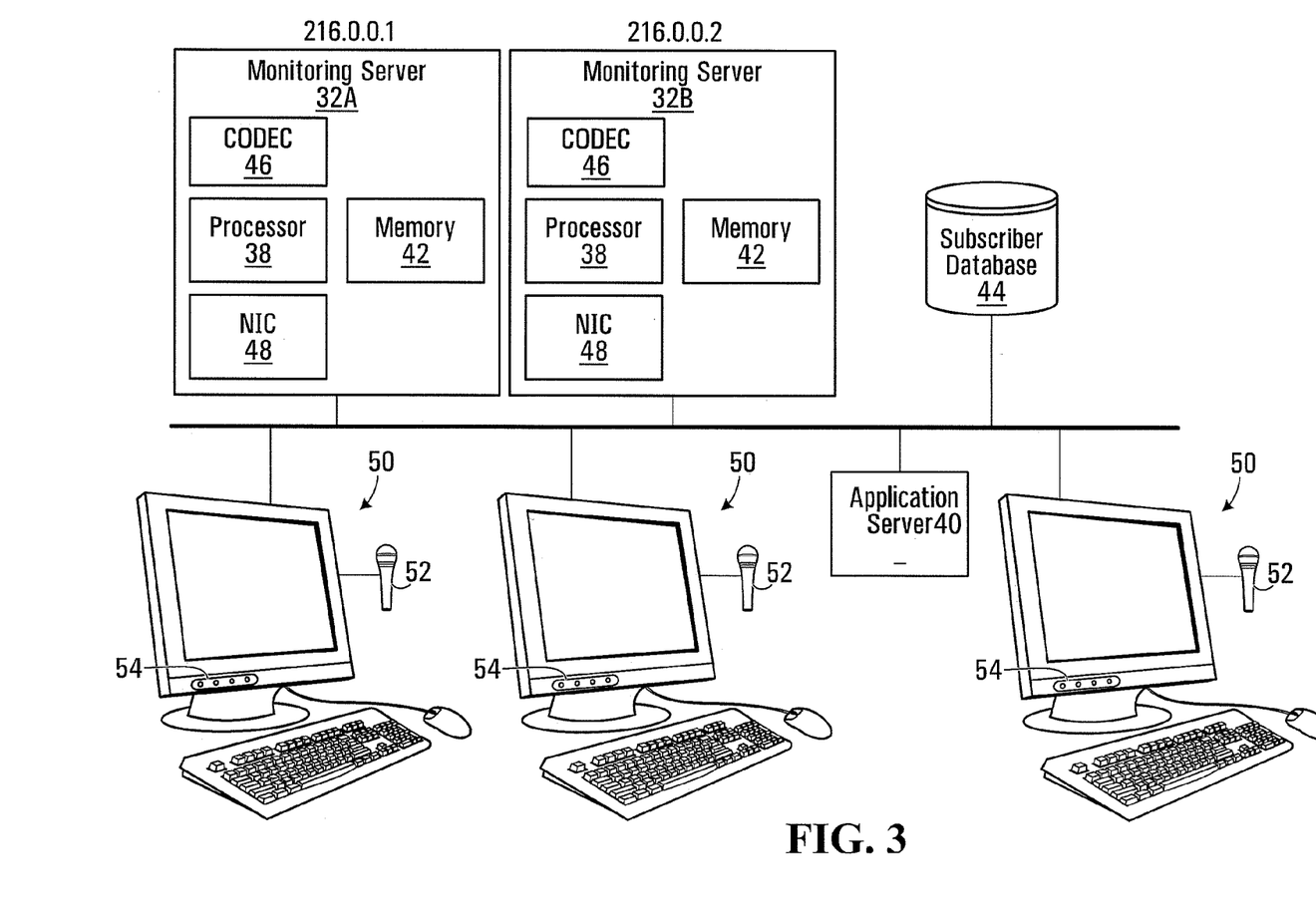
FIG. 3 is a schematic block diagram of a monitoring center in the alarm system of FIG. 1.

Monitoring center 26 is more particularly illustrated in FIG. 3. Monitoring center 26 is depicted as a single monitoring center in FIG. 1; however, it could alternatively be formed of multiple monitoring centers, each at a different physical location, and each in communication with data network 24. In particular, in order to process a high volume of alarm conditions from a large number of subscribers, monitoring center 26 includes a plurality of monitoring servers 32. Each monitoring server 32 processes alarm messages from a subset of panels 22 of subscribers serviced by monitoring center 26. Additionally, a monitoring server 32 may take part in two-way audio communication over network 24, with an interconnected panel 22.

Each monitoring server 32 may include a processor 38, network interface 48 and memory 42. Monitoring servers 32 may physically take the form of rack mounted cards. Monitoring servers 32 may be in communication with one or more operator terminals 50. An example monitoring server 32 may comprise a SUR-GARD™ GS2055 or TL2055GS communicator, available from DSC, modified to function as described herein.

Processor 38 of each monitoring server 32 acts as a controller for each monitoring server 32, and is in communication with, and controls overall operation, of each monitoring server 32. Processor 38 may include, or be in communication with memory 42 controlling the overall operation of monitoring server 32. Suitable software enabling each monitoring server 32 to process alarm messages, establish voice connections and encode/decode voice data may be stored within memory 42 of each monitoring server 32. Software may include a suitable internet protocol (IP) stack and applications/clients.

Each monitoring server 32 of central monitoring center 26 may be associated with an IP address and port(s) by which it can be contacted by alarm panels 22 (FIG. 1) to report alarm events over data network 24, and establish other IP connections. In the depicted embodiment, monitoring server 32a is associated with IP address 216.0.0.1; monitoring server 32b is associated with IP address 216.0.0.2. These addresses may be static, and thus always identify a particular one of monitoring servers 32 on network 24. Alternatively, dynamic addresses could be used, and associated with static domain names, resolved through a domain name service.

As well, in the depicted embodiment, monitoring servers 32 are interconnected on a local area network. A suitable router (not shown) may route data between servers 32 and to a respective server at their associated IP addresses.

Network interface 48 may be a conventional network interface that interfaces with communications network 24 (FIG. 1) to receive incoming signals, and may for example take the form of an Ethernet network interface card (NIC). Terminal(s) 50 may be computers, thin-clients, or the like, to which received data representative of an alarm event is passed for handling by human operators. Each terminal 50 may include a monitor, and a microphone 52, and an audio transducer/speaker 54 to allow audio to be captured and reproduced at terminal 50. Terminal 50 may include suitable terminal emulation software and thin-client software to allow audio to be streamed to/from speaker 54 and microphone 52.

An operator at terminal 50 may further be able to establish outgoing telephone calls, to the premises, the police, or third party security personnel. To that end, terminal 50 may be proximate a PSTN telephone, or may include or have access to voice-over-IP software (running at server 32, or elsewhere) allowing establishment of a telephone call or equivalent to a destination telephone number.

As will be appreciated, in the depicted embodiment example terminals 50 are connected to servers 32 by network. They could similarly be attached by conventional video and audio cables. If they are network attached, they do not need to be geographically proximate servers 32, but may be geographically remote and need only form part of monitoring center 26, virtually.

Optionally, applications executed at each terminal 50 may be provided by an application server 40, capable of providing these applications as Java applets, or other executable applications to terminals 50.

Monitoring center 26 may further include subscriber database 44 that includes a database under control of a database engine. Database 44 may contain entries corresponding to the various subscribers serviced by monitoring center 26. Database 44 may, for example, include the names and addresses, phone number, contact phone number, for each subscriber at premises 28 (FIG. 1). As well, database 44 may include the particulars of each detector 30, the identifier of each panel 22 assigned to a particular subscriber; account information; and the like. Database 44 may further log or archive alarm data received from panels 22, including audio data generated in connection with such alarm events, as further described below.

Monitoring center 26 receives and processes incoming messages from panels 22. Extracted data from the incoming messages may, for example, be overhead, or alarm data. The alarm data may be passed to processor 30, which, in turn, may make decisions under software control based upon that data. In particular, processor 38 may be programmed to initiate certain alarm handling procedures based on the received data.

For example, alarm data extracted from one or more incoming alarm data signals may specify that a particular detector 30 at a particular monitored premise 28 was tripped. Processor 38 may be programmed to notify a human operator at a terminal 50 using the alarm data, for further action. Further action may include the human operator consulting, and calling, one of a list of phone numbers associated with that particular monitored premise, stored in database 44. Database 44 may, for example, include the telephone number(s) of the homeowner and occupants, and the operator may call the homeowner to determine what the problem was/is.

Figure 4:
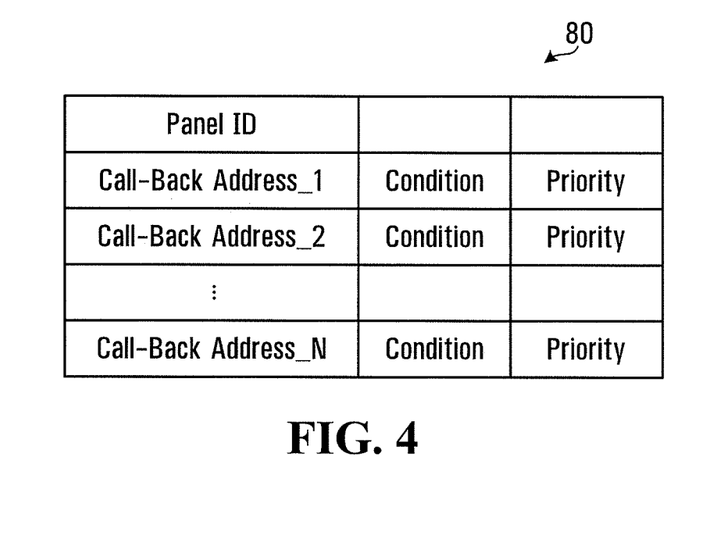
FIG. 4 is a schema of a database table stored at the monitoring center of FIG. 3.

In particular, database 44 may include a table 80 of call-back addresses for each panel serviced by monitoring center 26, as more particularly illustrated in FIG. 4. Table 80 may be linked to one or more other tables (for example through a panel identifier (PANEL_ID) field) for a particular alarm system. These other tables (not specifically illustrated) would uniquely identify the alarm system, and include further information such as the address of the premises, the name(s) of the occupants, the detectors at the premises, and the like.

In any event, as illustrated in FIG. 4, table 80 of call-back addresses may identify numbers/addresses to be contacted by monitoring center 26 in case of an alarm condition signalled to monitoring center 26, and the order in which the call-back numbers are to be contacted. Example table 80 may include several call-back addresses (CALL_BACK_ADDRESS_1, CALL_BACK_ADDRESS_2 . . . CALL_BACK_ADDRESS_n) in the form of telephone numbers or IP addresses, associated with each panel 22. The depicted call-back addresses may represent call-back addresses for two way communications to the premises; intruder conditions; and fire conditions. The condition for each call-back address may further be identified in table 80 (CONDITION).

As well, a numerical priority of each call-back address may also stored in the PRIORITY field. An operator at server 32 may contact the highest priority call-back address first. If that contact cannot be established at that call-back address, a lower priority call-back number may be contacted. Call-back addresses for the same condition, having equal priority may be contacted concurrently. The call-back address for two way communications to premises 28 may be treated like any other call-back address. Additionally, table 80 may further include a text descriptor of each call-back number.

Further, memory 62 of panel 22 may store data corresponding to the contents of table 80, as part of its configuration data. That is, call-back addresses may be stored at panel 22. As noted, memory 62 may be updated at panel 22 by an administrator (e.g. occupant at premises 28), or an installer, through a keyboard or other interface at panel 22, using a suitable user interface provided by panel 22.

Optionally, one or more of call-back addresses at panel 22 may be updated automatically. For example, if panel 22 includes a cellular network interface (for example, as telephony interface 68), the cellular network interface may provide the cellular network telephone number assigned to the interface may be provided by the interface to processor 60, and then stored in memory 62. The telephone number may be provided after a cellular network connection to the interface is established, or after the interface is initialized.

Exemplary of embodiments of the present invention, table 80 at monitoring server 32 may be updated with the corresponding contents of memory 62.

Monitoring center 26 may dispatch an update request over network 24 to the IP address of panel 22. The IP address of panel 22 may be static or dynamically assigned. If the IP address of panel 22 is assigned dynamically, panel 22 may be provided to monitoring center 26 by panel 22. In response to the update request, panel 22 under software control may provide one or more datagrams including data in memory 62 that may be used to update table 80 for that panel 22. Monitoring center 26, under control of processor 38, in turn, may use the received data to update table 80 for that panel 22. In an embodiment, central monitoring center 26 may periodically query each panel 22. For example, monitoring center 26 may query each panel monthly, bi-monthly, quarterly, or other suitable intervals under software control. Desired intervals may be programmed by an operator at terminal 50.

Alternatively, monitoring center 26 may query a particular panel 22 in response to operator instructions entered, for example, at terminal 50, to retrieve call-back addresses. The operator instructions may, for example, be dispatched by an operator at monitoring center 26 to initiate retrieval of call-back numbers and associated data from panel 22 over network 24, while or after the operator is servicing a signalled alarm condition from panel 22.

Alternatively, the content of memory 62 may be used by panel 22 to automatically provide call-back addresses upon notification of an alarm condition to monitoring center 26, as detailed below.

Figure 5:
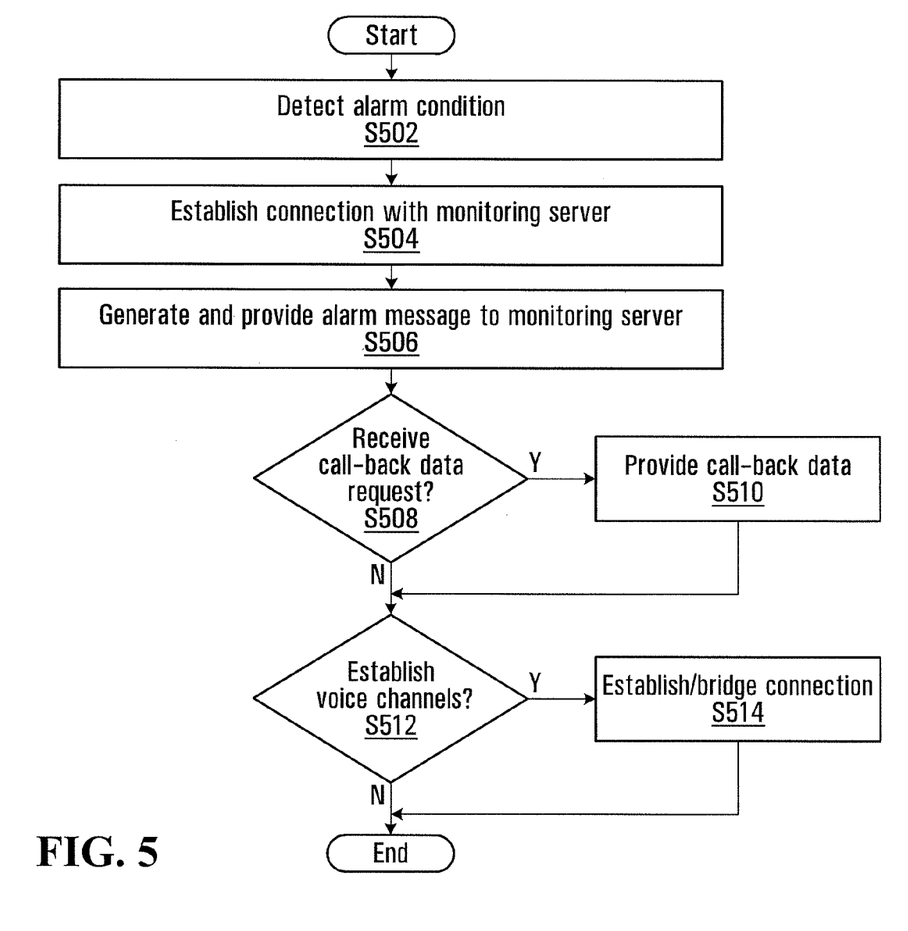
FIGS. 5 and 6 are flow diagrams depicting steps performed at the alarm panel and central monitoring center of FIG. 1, respectively, exemplary of embodiments of the present invention.
Figure 6:
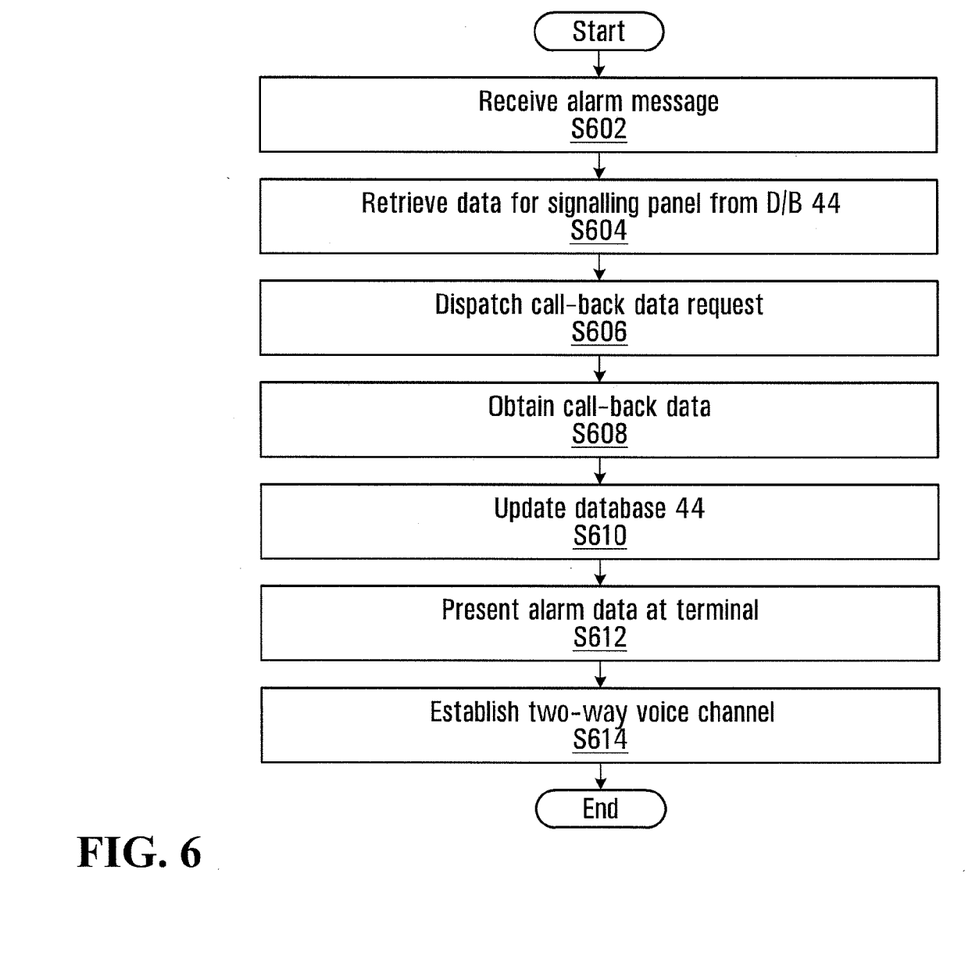

Now, in the presence of an alarm condition, alarm messages are dispatched and handled as depicted in FIGS. 5 and 6. Specifically, upon detection of an alarm condition at a detector 30 at premises 28 in block S502, panel 22 under software control generates an alarm message and dispatches it to the assigned monitoring server 32 for that panel 22 in block S506 using network 24, and the network address (e.g. IP address) of server 32 assigned to that panel. As part of the dispatch of the message, alarm panel 22 may establish a TCP/IP socket (and thus a connection over network 24) to the monitoring server 32 in block S504. Each alarm message generated/dispatched in block S506 includes at least an identifier of panel 22 originating the message and the sensed condition giving rise to the alarm condition.

Monitoring server 32, upon receipt of the alarm message in block S602 may more particularly identify the panel 22 and associated premises 28 using, for example, database 44, and generate a message or communication for down stream handling, to eventually dispatch personnel to the monitored premises as required. The message or an indicator thereof may, for example, be dispatched to an operator at one of terminals 50, for further handling.

As part of this dispatch, the record within database 44 associated with the signalling panel 22 may be retrieved in block S604. Data therefrom may be presented to the operator at terminal 50. In particular, the operator may be presented with call-back addresses associated with panel 22, and associated with the signalled alarm condition. Optionally, only those call-back addresses associated with the particular signalled alarm condition may be presented at terminal 50. This would simplify operation at terminal 50, as an operator would not need to determine the correct call-back address(es) for a signalled condition.

Optionally, in block S606, monitoring server 32 may dispatch a call-back address query message to panel 22 to update table 80 for that panel. The query message may be a packet based message, known and understood by both panel 22 and server 32. In response, panel 22 may provide the contents of memory 62 identifying call-back numbers, and associated data used to populate table 80 at monitoring server 32 in blocks S508 and S510. The call-back address data may be received at monitoring server 32 in block S608. Monitoring server 32, in turn, may update table 80 of database 44 using the received data in block S610.

Next, an operator at monitoring center 26 may be presented with a user interface at terminal 50 to allow the operator to see status information about a signalled alarm—including the address of the premises, the name of the occupant(s), call-back numbers, etc. in block S612. The user interface may be generated by software at terminal 50, or by or in conjunction with software at server 32, using data from database 44. For example, a user interface may be provided as an HTML page using HTML code stored at server 32 and presented by a browser hosted at terminal 50. The user interface at terminal 50 could be presented using terminal emulation or custom software at terminal 50, or in any other way apparent to those of ordinary skill.

If one or more call-back addresses are identified, these may be presented to the operator at terminal 50, who may initiate call-back to the identified addresses.

As will be appreciated, call-backs may also be partially or wholly automated at monitoring center 26. For example, if the call-back numbers identify a call-back address for two-way communication, monitoring center 26 may automatically attempt to establish voice channels with panel 22 in block S512-S514 and S614.

In particular, two-way voice channels may be established by monitoring server 32 placing a call to a suitable call-back address stored in table 80, allowing individuals audible at audio detector 36 in communication with panels 22 to communicate with a monitoring server 32, through speakers 54 and/or microphones 52 at terminals 50 to allow operators at terminals 50 to communicate with premises 28, in real time.

The two-way voice channel(s) may be a conventional PSTN or cellular call to panel 22. Alternatively, the two-way voice channels may be voice-over-IP connections, established to panel 22, for example using the H.323, MGCP, SIP and/or other suitable protocol(s), using appropriate clients hosted at panel 22 and monitoring center 26.

Once established, the voice connections may be routed to an operator at monitoring server 32, for example at a terminal 50. This may, for example, be done by serializing the voice data received by the software at server 32 from panel 22, and providing the streamed data to terminal 50, by way of thin client software at terminal 50.

In blocks S512 and S614, the connection to server 32 may be connected/bridged to a terminal 50 proximate an available operator. The operator at terminal 50 may listen to audio at premises 28 and speak to premises 28. Audio at premises 28 may be picked up by speaker 34, converted to data by codec 70 and provided to monitoring center 32 over network 24, or directly over PSTN 16 for decoding at monitoring server 32 and playback at a speaker 54.

Likewise audio spoken into microphone 52 may be encoded by codec 46 at monitoring server 32 or by thin client software at terminal 50. Corresponding data may be provided to panel 22 over PSTN 16 or network 24. At panel 22, the audio data from server 32 may be decoded using codec 70, if required. Decoded audio may be provided to speaker 34 allowing real-time, two-way, audio communication between monitoring center 26 and panel 22.

Additionally, further call-back numbers identified in table 80 and associated with the signalled alarm condition may be presented to an operator at terminal 50. The operator may in turn, call the call-back numbers in accordance with the priority identified in table 80.

If the operator is unsuccessful in reaching individuals at the provided call-back addresses, the operator may optionally initiate a transfer of call-back data from memory 62 of panel 22, as described above.

In alternate embodiments, any call-back numbers associated with a particular signalled alarm condition could be provided concurrently with the alarm message signalling the alarm condition, or as part of the message.

Conveniently, in the above described embodiments, call-back addresses can be maintained at the premises by those most familiar with these addresses, or upon initial set-up by an installer, or automatically. As the call-back addresses change, they may be updated at the premises, possibly without contacting a service provider.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of maintaining a list of call-back addresses associated with an alarm panel at a user premises, comprising:
    storing said list of call-back addresses at an alarm monitoring center for retrieval at said monitoring center upon receipt of an alarm notification from said panel;
    maintaining a version of said list of call-back addresses at said panel;
    initiating from said monitoring center retrieval of said version of said list, and retrieving to said monitoring center said version of said list of call-back addresses from said panel over a packet switched network;
    updating said list of call back addresses at said alarm monitoring center, to correspond said version of said list of call-back addresses at said panel.

2. The method of claim 1, wherein said list of call-back addresses is retrieved from said panel automatically at scheduled intervals.

3. The method of claim 1, wherein said list of call-back addresses comprises a cellular telephone number.

4. The method of claim 1, wherein said list of call-back addresses comprises a PSTN telephone number, or an internet address.

5. A method of operating a monitoring center that receives signals indicative of sensed alarm conditions at a premises from an alarm panel over a packet switched data network, said method comprising:
    maintaining at said monitoring center a record identifying said alarm panel, said record including a field for storing a call-back address;
    initiating at said monitoring center retrieval from said panel of a call-back address stored at said panel and retrieving from said panel said call-back address stored at said panel, said call-back address to be contacted in case of an alarm condition at said alarm panel, and signalled from said alarm panel to said monitoring center over said packet switched data network;
    storing said call-back address as retrieved from said panel at said monitoring center in said field, for later retrieval and call-back of said call-back address in the event of an alarm condition signalled to said monitoring center.

6. The method of claim 5, wherein said call-back address comprises a cellular telephone number, stored automatically at said panel after said panel connects to a cellular network.

7. The method of claim 5, further comprising retrieving said call-back address from said record and placing a telephone call to said call-back address, said telephone call for two-way communication between said panel and said monitoring center, in response to having received a reported alarm condition.

8. The method of claim 7, wherein said telephone call is a voice over internet protocol (VoIP) call.

9. The method of claim 5, wherein said call-back address comprises a PSTN telephone number, or an internet address.

10. The method of claim 5, wherein said record includes at least one field for storing multiple call-back addresses, and wherein said method further comprises storing said multiple call-back addresses at said panel, and providing said multiple stored call-back addresses from said alarm panel to said monitoring center over said packet switched network.

11. The method of claim 5, further comprising contacting said multiple call-back addresses from said monitoring center in a defined order in response to an alarm condition.

* * * * *